(12) United States Patent
Prince

(10) Patent No.: US 8,978,991 B2
(45) Date of Patent: Mar. 17, 2015

(54) GENERATING A DECORATIVE IMAGE BAR CODE USING FILTER PATTERNS

(71) Applicant: Christopher Prince, San Francisco, CA (US)

(72) Inventor: Christopher Prince, San Francisco, CA (US)

( * ) Notice: Subject to any disclaimer, the term of this patent is extended or adjusted under 35 U.S.C. 154(b) by 63 days.

(21) Appl. No.: 13/815,816

(22) Filed: Mar. 15, 2013

(65) Prior Publication Data

US 2014/0263666 A1    Sep. 18, 2014

(51) Int. Cl.
*G06K 19/06* (2006.01)

(52) U.S. Cl.
CPC ................................. *G06K 19/06037* (2013.01)
USPC ....... 235/494; 235/457; 235/462.11; 382/284

(58) Field of Classification Search
USPC ...................... 235/494, 457, 462.11; 382/284
See application file for complete search history.

(56) References Cited

U.S. PATENT DOCUMENTS

| | | |
|---|---|---|
| 7,207,491 B2 | 4/2007 | Lubow |
| 8,144,922 B2 | 3/2012 | Kawabe |
| 2006/0215931 A1* | 9/2006 | Shimomukai ................. 382/284 |
| 2008/0078836 A1* | 4/2008 | Tomita ..................... 235/462.11 |
| 2013/0099000 A1* | 4/2013 | Hoshino et al. ............... 235/457 |

OTHER PUBLICATIONS

Visualead-About (no author listed), "Visualead—About Us", Retrieved from the Internet: http://www.visualead.com/about-us/ on Jun. 12, 2013.
Visualead-Features (no author listed), "Visualead—Features", Retrieved from the Internet: http://www.visualead.com/features/ on Jun. 12, 2013.

* cited by examiner

*Primary Examiner* — Allyson Trail

(57) ABSTRACT

A composite image is generated from a decorative image, a bar code, and one or more filter patterns. The composite image visually approximates the decorative image, yet the composite image is machine-readable by a scanner capable of reading the bar code, and the composite image encodes the same data as the bar code. Filter patterns provide a flexible way to generate the composite image by selectively updating the decorative image. Updates may be applied in only the locations where necessary, and only by the amount necessary, in order for the composite image to be recognized as a bar code. Also, updates may be applied in arbitrary color spaces, including color spaces where brightness can be altered with less impact on human color perception.

12 Claims, 5 Drawing Sheets

NOTE: Labels 102 and 104, and their associated callout lines, were added

NOTE: Sheet layout was changed to accommodate larger figures, images in figures were enlarged, image resolution was increased to match enlarged images, and the "FIG." captions (in FIGS. 1a, 1b, 1c) and labels and callout lines (in FIGS. 1b, 1c) were repositioned to accommodate the new layout

GENERATING A DECORATIVE IMAGE BAR CODE USING FILTER PATTERNS

BACKGROUND OF THE INVENTION

Bar codes, which comprise both one-dimensional and two-dimensional codes, have become popular for encoding data. However, because these, codes were designed to be machine-readable by a bar code scanner, they are generally visually unattractive. The most common representations appear as jumbled collections of dark and light regions, or "cells".

A bar code that is machine-readable but visually appealing could be advantageous. However, realizing this by defining a new bar code format might require significant time and resources to gain significant adoption. One could avoid the problems of adoption if one could instead produce a hybrid: a visually appealing image that can also be recognized by an existing bar code scanning device as a valid code. However, there are challenges with producing such a hybrid image.

For example, any approach that blindly destroys part of the code and replaces it with visually appealing data, intending to rely on redundancy or error correction built into the code, can alter only a fraction of the code before the code becomes unscannable. Furthermore, any such approach makes the code less robust against routine scanning errors.

As another example of the challenge, any approach that simply alters the shape or size of bar code cells is quite limited in the kinds of effects it can achieve. It would not be possible to visually represent arbitrary images with a high amount of fidelity using such an approach.

As a third example of the difficulty, any approach that applies a uniform image compositing operation between a decorative image and an image of a bar code is unlikely to achieve satisfactory results. Within each cell, the resulting composite image can either be machine readable but at the expense of human recognition (i.e., the entire cell is quite dark or light), or it can be human recognizable but at the expense of machine readability (i.e., a bar code scanner cannot easily decide whether to interpret the cell as a light or dark region), but not both.

BRIEF SUMMARY OF THE INVENTION

In one embodiment of the present invention, a composite image is generated from a decorative image having a plurality of pixels, a bar code having a plurality of cells, and one or more filter patterns; wherein the composite image visually approximates the decorative image, yet the composite image is machine-readable by a scanner capable of reading the bar code, and the composite image encodes the same data as the bar code.

The term "decorative" should not be taken as limiting the type of image supported. The decorative image can be any arbitrary pixel image.

As used in this specification, a filter pattern is a representation of a set of alterations or constraints that should be made to the decorative image, with values of said alterations or constraints defined at every position within the area spanned by the filter pattern. Filter patterns provide a flexible way to selectively update the decorative image. Alterations or constraints can be applied only in locations where necessary, and only by the amount necessary, in order for the composite image to be recognized as a bar code. Alterations or constraints can also be applied in arbitrary color spaces, including color spaces where brightness can be altered with less impact on human color perception.

In the aforementioned embodiment: the bar code is positioned to coincide with some region of the decorative image; one or more filter patterns are assigned to each bar code cell; and each pixel of the composite image is generated from the decorative image and the filter patterns.

More specifically, the formation of the composite image comprises, for each pixel position in the composite image: retrieving the pixel color in the decorative image at that pixel position; retrieving the values of all filter patterns at that pixel position; and updating the pixel color by applying all constraints or alterations specified by the set of filter pattern values.

In another embodiment of the present invention, filter patterns may define operations in an arbitrary color space, and when updating a pixel color using one of these filter patterns: the pixel color is transformed into the arbitrary color space; the filter pattern operation is applied in the arbitrary color space; and the updated color is transformed back into the color space of the original pixel.

Operations in arbitrary color spaces are useful because numerous bar code scanners consider only brightness, while the human visual system considers color as well. By altering brightness independently from color (to the extent this is possible), one can better produce machine-readable cells that also preserve features important to the human visual system.

In another embodiment of the present invention, a filter pattern may be defined as to: only manipulate a subset of a cell; or vary the amount of manipulation across a cell.

In this way, portions of the cell that are more critical to recognition by a scanner can be constrained or altered by a greater amount (to ensure proper recognition by the bar code scanner), while portions of the cell that are less critical to recognition can be constrained or altered by a lesser amount. (Bar code scanners typically do not examine every visible aspect of a given code.) This maximally preserves the decorative image when forming the composite image.

In another embodiment of the present invention, filter patterns may be chosen and assigned so as to adorn the composite image with some additional visual element, such as a watermark, banner, or other design.

DETAILED DESCRIPTION OF THE INVENTION

Figure 1A:
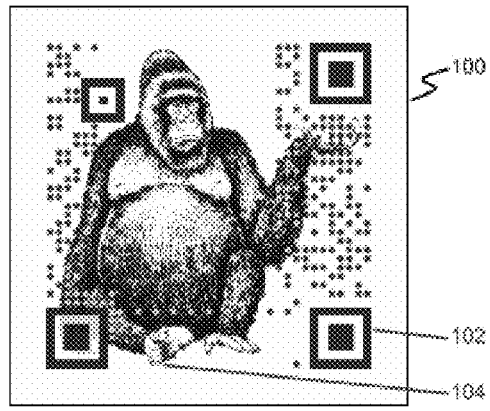
FIGS. 1a, 1b, and 1c illustrate an example of a composite image, bar code, and decorative image, according to one embodiment of the invention.
Figure 1B:
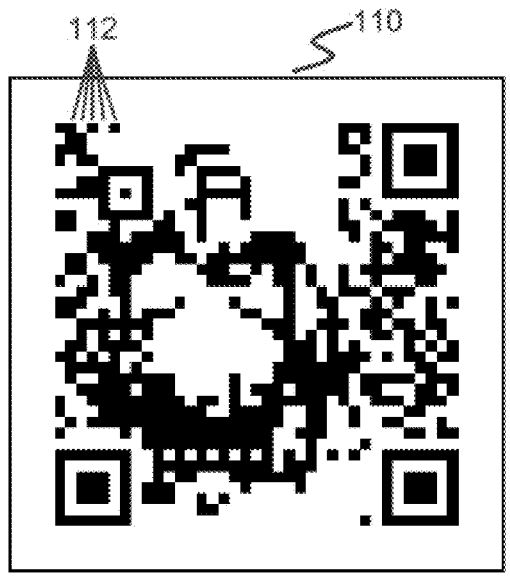
Figure 1C:
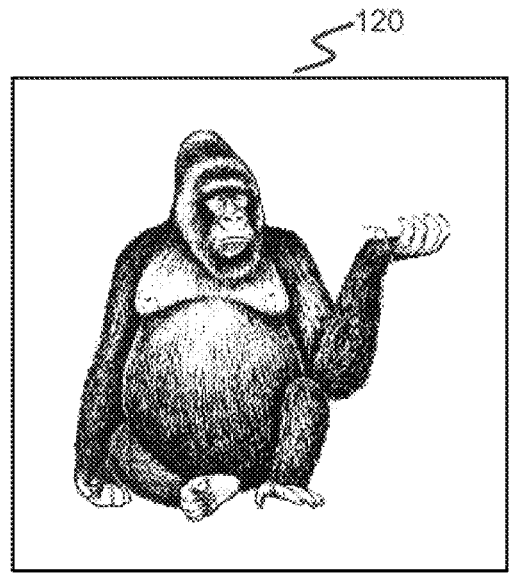
Figures 2, 3:
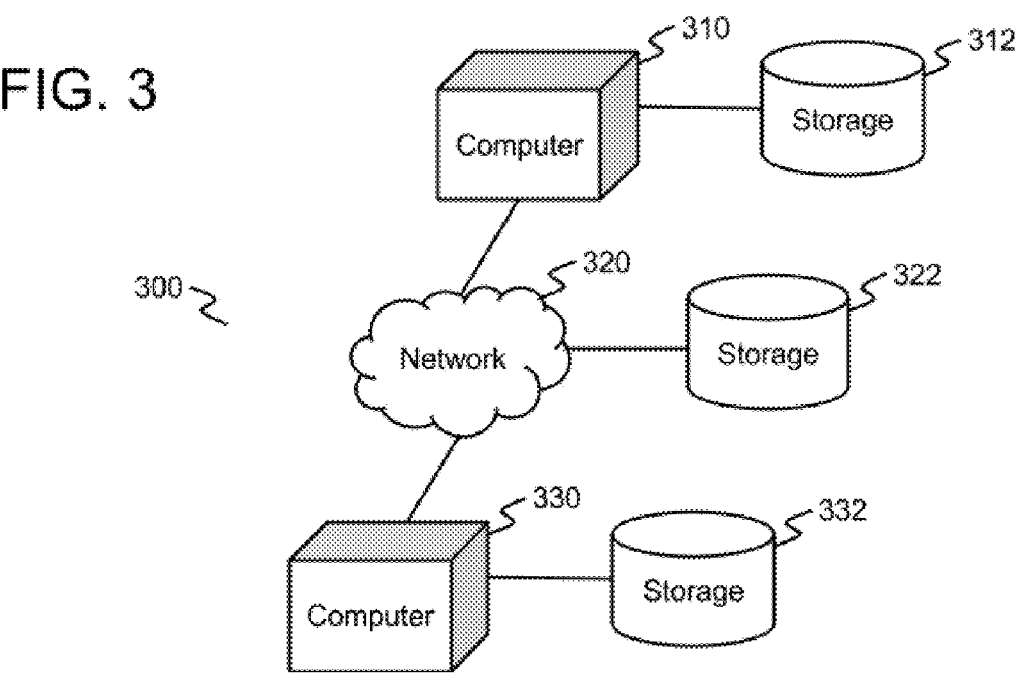
FIG. 2 illustrates an example of a filter pattern, according to one embodiment of the invention.
FIG. 3 illustrates a system for generating a composite image from a decorative image, a bar code, and one or more filter patterns, according to one embodiment of the invention.

FIG. 1a illustrates an example of a decorative image bar code 100 created using the present invention. It is a composite image, generated from a bar code 110 as shown in FIG. 1b, a decorative image 120 as shown in FIG. 1c, and several filter patterns, an example of which is illustrated in FIG. 2. The composite image 100 can be seen to contain both a bar code characteristic 102 and a decorative image characteristic 104.

The bar code 110 comprises a plurality of cells 112. In the example shown in FIG. 1b, the bar code is a two-dimensional code, and the bar code comprises a grid of square cells, each cell having a value that is one of two brightness levels, which may be denoted as "dark" and "light". For simplicity, and without loss of generality, the remainder of this specification will focus on bar codes having such a form, but the methods and systems described in the present invention are equally applicable to other bar codes, including: one- and two-dimensional codes; codes having cells of other shapes and sizes; and codes where each cell may take on more than two possible values, and whose values may be denoted by something other than brightness. One skilled in the art shall be able to apply these methods and systems to other bar codes where each cell covers a particular region of the code, and each cell has a value chosen from a small set of possible values.

FIG. 2 illustrates an example of a filter pattern 200. A filter pattern encodes a set of values that are used to update the colors of pixels whose positions coincide with the filter pattern. A filter pattern may span exactly one bar code cell, or numerous cells, or subsets of one or more cells. For simplicity, and without loss of generality, the remainder of this specification will focus on filter patterns spanning exactly one cell, but the methods and systems described in the present invention are equally applicable to all other filter pattern extents. One skilled in the art need only know, for a given pixel position, which filter patterns coincide with that position, and the specific location within each filter pattern to which the pixel position corresponds.

In the example filter pattern 200, if each position is encoding a minimum allowed brightness 202 and a maximum allowed brightness 204, then applying a value from such a filter pattern to a pixel color comprises updating the pixel's brightness to ensure it lies between the minimum and maximum allowed brightness.

It is simplest to consider a filter pattern embodiment that comprises a plurality of pixels, wherein each pixel encodes values representing a constraint or alteration. However, this is not the only possibly embodiment. For example, a filter pattern could be defined using a mathematical formula, or another suitable representation, as long as pixel positions in a composite image or a decorative image can be mapped to constraint or alteration values in a filter pattern.

A filter pattern need not have the same resolution (width and height) as the region of pixels in a composite image or a decorative image spanned by the filter pattern. For example, standard image processing techniques may be used to upsample or downsample a filter pattern as needed.

Filter patterns may not directly encode a specific type of constraint or alteration to be carried out. For example, a filter pattern, if being used for a constraint, may only encode a pair of values to be treated as a minimum and maximum. In one embodiment, a computer program applying filter patterns may only apply brightness constraints to the pixels of a decorative image. In such an embodiment, the type of constraint or alteration is predetermined, and the filter patterns only directly encode the amount of constraint or alteration to apply.

The values in a filter pattern can vary across a bar code cell, as illustrated in FIG. 2. In this example filter pattern, decorative image pixels that coincide with the center of the filter pattern (where the allowed brightness range is 0% to 20% in this example) will be dim after the filter pattern values are applied, decorative image pixels at the corners of the filter pattern (where the allowed brightness range is 0% to 100%, i.e. the entire range of possible values) will remain unmodified after the filter pattern values are applied, and decorative image pixels in-between will similarly be constrained by the allowed brightness range at each corresponding position in the filter pattern. In general, using less restrictive or less severe filter pattern values allows the composite image to much better approximate the decorative image.

FIG. 3 illustrates an example system 300 for generating a composite image from a decorative image, a bar code, and one or more filter patterns. Generation of the composite image occurs on a first computing system 310. System 310 comprises a computer program for generating the composite image, along with any combination of software, hardware, or firmware necessary for running that computer program.

The computer program, decorative image, bar code, and filter patterns used in system 300 are retrieved from some combination of: local memory inside system 310, locally attached storage 312, network-attached storage 322 via a network 320, or a second computing system 330 also via a network 320, wherein the second computing system may have itself retrieved any computer program, decorative image, bar code, and filter patterns patterns from local memory inside system 330, locally attached storage 332, or network-attached storage 322.

As the composite image is generated by system 310, it is output to any combination of: local memory inside system 310, locally attached storage 312, network-attached storage 322 via a network 320, or a second computing system 330 also via a network 320. The composite image may then additionally be converted to one or more graphics file formats, such as PNG, JPEG, or GIF, and these too may be output to any combination of the locations to which the composite image could be output.

Figure 4:
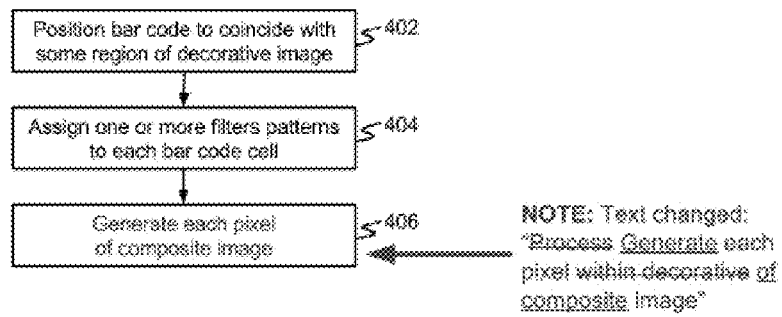
FIG. 4 illustrates high-level steps for producing composite image, according to one embodiment of the invention.

FIG. 4 illustrates the high-level steps involved in generating a composite image. At step 402 a decorative image and a bar code are positioned relative to each other so that the bar code coincides with some region of the decorative image. The positioning may be done automatically by a computer program such as the one in system 310, or it may involve interactive or non-interactive instruction from a user. For simplicity, and without loss of generality, consider the bar code as coinciding with some subset of the decorative image. If the bar code extends beyond the decorative image, consider the decorative image as having a border large enough to contain the bar code.

At step 404, one or more filter patterns are assigned to each cell of the bar code. By way of example, for each dark or light cell in the bar code, a corresponding darkening or lightening filter pattern is likely to be assigned to that cell.

A given bar code cell may have more than one filter pattern assigned to it. As an example, one set of filter patterns may be assigned across the entire bar code to emulate the dark or light cells in the composite image, while an additional set of filter patterns may be assigned across a portion of the bar code to adorn the composite image with some additional visual element, such as a watermark, banner, or other design. Safeguards, such as those that could be implemented in a computer program, may be used to guard against conflicting filter patterns being assigned to a cell (e.g., one filter pattern that darkens the cell and one that lightens it).

Different cells may use different filter patterns. As an example, some cells may be assigned a filter pattern that enforces darkness or lightness only in the center of each cell. While in other cells, it may be necessary (e.g., due to specifics of the bar code scanner intended to be used), to use a more conservative filter pattern that enforces darkness or lightness on the entire cell. Alternately, it may be desirable to use a variety of filter patterns, having different properties or designs, to achieve particular aesthetic effects in the composite image.

At step 406, the plurality of pixels comprising the composite image is generated, using the decorative image and the filter patterns, as described below.

Figure 5:
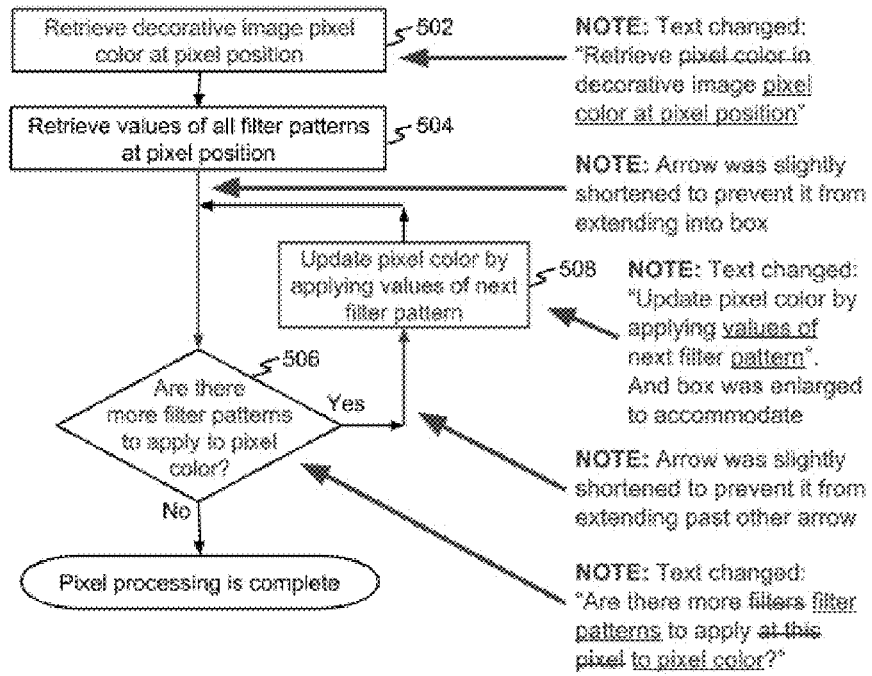
FIG. 5 illustrates steps for generating each pixel of a composite image, according to one embodiment of the invention.

FIG. 5 illustrates the steps involved in generating each pixel of the composite image.

At step 502, the position of the composite image pixel currently being generated is used to retrieve the decorative image pixel color at that position.

At step 504, the position of the composite image pixel currently being generated is used to retrieve the values of all filter patterns coinciding with that position.

At step 506, if all filter patterns have been applied to the current pixel color, processing is complete, and the pixel color for the composite image has been determined.

However, if at step 506 there is a filter pattern that has not been applied to the current pixel color, the pixel color is updated at step 508 using the values of the next unapplied filter pattern, and execution returns to step 506.

Figures 6, 7:
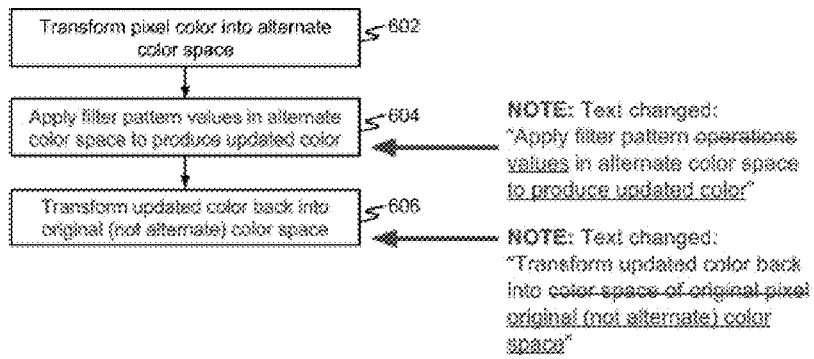
FIG. 6 illustrates the application of a filter pattern that operates in a color space different from that of the decorative image, according to one embodiment of the invention.
FIG. 7 illustrates, numerically, examples of the application of specific filter pattern values to specific RGB pixel values, according to one embodiment of the invention.

The filter pattern operation in step 508 may operate in a different color space than the color space of the current pixel. For example, the current pixel may be defined with red, green, and blue (R, G, B) components, while the filter pattern operation may operate on brightness (Y) in the (Y, I, Q) color space. FIG. 6 illustrates the steps that take place when the color spaces differ.

At step 602 in FIG. 6, the current pixel color is transformed from the color space of the decorative image into the color space used by the current filter pattern. This color space transformation comprises operations that are well known to those versed in the art of image processing. At step 604, the filter pattern values are applied to the transformed pixel color in the filter pattern color space. At step 606, the pixel color with the filter pattern values now applied is transformed back into the decorative image color space, again using operations that are well known to those versed in the art of image processing.

FIG. 7 illustrates, numerically, several examples of the generation of a composite image pixel color starting from a decorative image pixel color. For reference in these examples: the R, G, B, and Y color components each exist in the range; the I color component exists approximately in the range [−0.6, 0.6]; and the Q color component exists approximately in the range [−0.52, 0.52].

Row 702 demonstrates a red pixel with (R, G, B) value (1.0, 0.0, 0.0) that coincides with a dark cell of the bar code. Because the pixel's Y value (0.3) is above the maximum Y value permitted by the filter pattern at that position (where the range of allowed brightness is 0% to 20%) application of the filter pattern reduces the Y value to 0.2. When converted back to the (R, G, B) color space, the processed pixel has the color (0.9, 0.0, 0.0) which is a slightly darker shade of red.

Row 704 demonstrates a pixel with the same red color that coincides with a light cell of the bar code. The pixel's Y value gets increased from 0.3 to 0.8 when the filter pattern is applied, and the resulting color in the (R, G, B) color space is (1.0, 0.5, 0.5), which is a lighter value of red.

Row 706 demonstrates a dark gray pixel that coincides with a dark cell of the bar code, and row 708 demonstrates a light gray pixel that coincides with a light cell of the bar code. In both cases, the Y value of the pixel falls within the range allowed by the filter pattern at that position, so the Y value remains unchanged, and the color of the generated composite image pixel in the (R, G, B) color space is identical to that of the decorative image pixel.

Figure 8A:
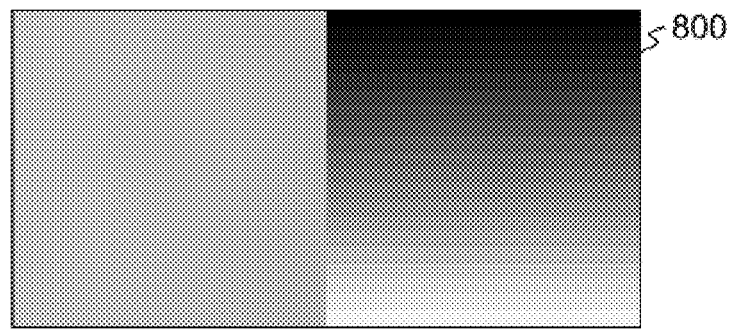
FIGS. 8a, 8b, 8c, and 8d illustrate, visually, examples of the application of specific filter patterns to specific decorative image regions, according to one embodiment of the invention.
Figure 8B:
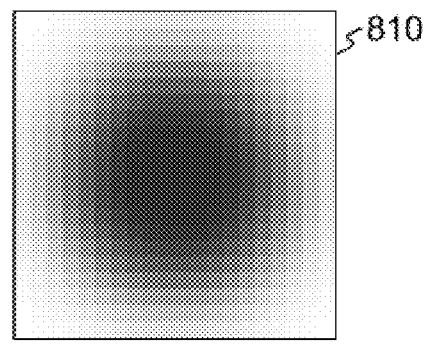
Figure 8C:
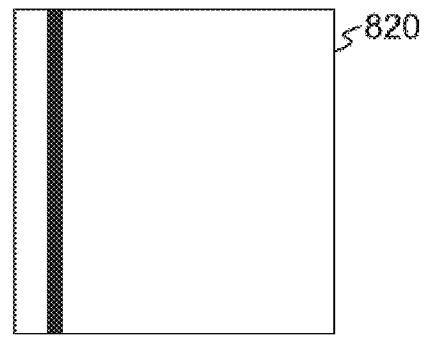

FIGS. 8a, 8b, 8c, and 8d illustrate a detailed view of: a portion of decorative image coinciding with two bar code cells, the corresponding portion of a generated composite image, and two filter patterns assigned to each bar code cell. More specifically, the decorative image region 800 in FIG. 8a comprises a left half containing a solid gray color and a right half containing a gradient from black to white. The filter pattern 810 in FIG. 8b and the filter pattern 820 in FIG. 8c represent filter pattern values that constrain the brightness of each corresponding pixel to lie between 0% and the brightnesses shown in the corresponding position in 810 and 820, where the white areas at the edge of those images represent 100% brightness, the darkest areas represent 20% brightness, and other areas represent brightnesses between those extremes. Note that grayscale pixels are being used in this example for simplicity, but similar logic would apply for colored pixels.

Filter pattern 810 in FIG. 8b is an example of the type of filter pattern that might be used to represent a dark cell in the composite image. Filter pattern 820 in FIG. 8c is an example of a filter pattern that might be used to adorn the composite image with some additional visual element, such as part of a watermark, banner, or other design.

Figure 8D:
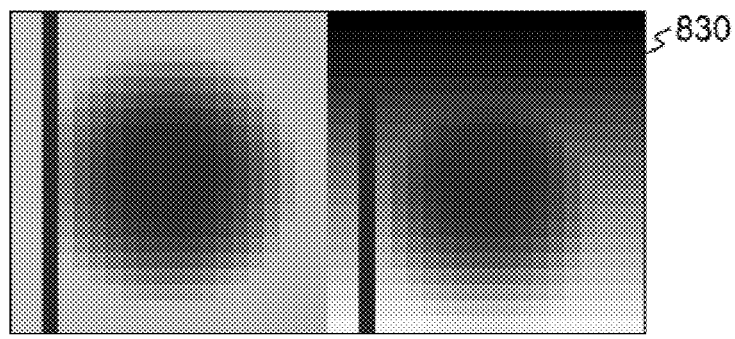

The composite image region 830 in FIG. 8d illustrates the result after applying both filter patterns, 810 and 820, to each half of the decorative image region 800. As shown in the figure, both halves of the composite image region contain the visual element introduced by the adorning filter pattern 820. Additionally, even after applying the constraints of filter pattern 810, both halves of the composite image region preserve the corresponding halves of the decorative image region almost perfectly near the border of each cell, while areas further inward still preserve substantial detail. Note that the too-right quarter of the composite image region, more than any other quarter of that region, preserves the corresponding area of the decorative image region, because the top-right quarter of the decorative image region was already closest to meeting the constraint constraints being applied by filter pattern 810.

As demonstrated by FIGS. 8a, 8b, 8c, and 8d, the use of filter patterns enables the composite image region to visually approximate the decorative image region. This is because filter patterns can allow for: only manipulating a subset of a cell; varying the amount of manipulation across a cell; and leaving the decorative image unmodified at pixels where the decorative image already satisfies the constraints being applied by the filter patterns.

What is claimed is:

1. A method for generating a composite image having a plurality of composite image pixels, the method comprising:
    providing a decorative image having a plurality of decorative image pixels, a bar code having a plurality of bar code cells, and one or more filter patterns;
    positioning the bar code to coincide with a region of the decorative image;
    assigning one or more of the filter patterns to each of the bar code cells; and
    generating the composite image pixels;
the step of generating the composite image pixels, each having a pixel position, comprising, for each pixel position:
    retrieving a decorative image pixel color at said pixel position;
    retrieving all filter pattern values at said pixel position; and applying all filter pattern values at said pixel position to the decorative image pixel color, this producing a composite image pixel color;

whereby the composite image visually approximates the decorative image, yet the composite image is machine-readable by a scanner capable of reading the bar code, and the composite image encodes the same data as the bar code.

2. The method of claim 1, wherein the decorative image pixels are defined in a decorative image color space, at least one of the filter patterns is an alternate-color-space filter pattern that operates in a filter pattern color space different from the decorative image color space, and the step of applying the alternate-color-space filter pattern values to the decorative image pixel color comprises:

transforming the decorative image pixel color from the decorative image color space into the filter pattern color space, thus producing a transformed pixel color;

applying the alternate-color-space filter pattern values to the transformed pixel color in the filter pattern color space, thus producing an updated transformed pixel color; and transforming the updated transformed pixel color from the filter pattern color space back into the decorative image color space.

3. The method of claim 2, wherein:

the decorative image color space comprises a red color component, a green color component, and a blue color component;

the filter pattern color space comprises a brightness color component;

the alternate-color-space filter pattern values define a minimum brightness and a maximum brightness at each said pixel position; and the step of applying the alternate-color-space filter pattern values to the transformed pixel color in the filter pattern color space comprises restricting the brightness color component of the transformed pixel color so that it has a value between the minimum brightness and the maximum brightness.

4. The method of claim 1, wherein at least one of the filter patterns is a vary filter pattern, comprising different filter pattern values at different positions within the varying filter patter.

5. The method of claim 4, wherein the varying filter pattern comprises at least one position wherein the step of applying the varying filter pattern values to the decorative image pixel color, thus producing the composite image pixel color, produces the same composite image pixel color as the decorative image pixel color.

6. The method of claim 1, wherein at least one of the filter patterns is an adorning filter pattern, having values that comprise a means for adorning the composite image with a visual element that was not present in the decorative image.

7. A system for generating a composite image having a plurality of composite image pixels, the system comprising:

a computer program configured to execute instructions to:
provide a decorative image having a plurality of decorative image pixels, a bar code having a plurality of bar code cells, and one or more filter patterns;
position the bar code to coincide with a region of the decorative image;
assign one or more of the filter patterns to each of the bar code cells; and
generate the composite image pixels; and a computing system capable of executing the computer program;

the instructions to generate the composite image pixels, each having a pixel position, comprising, for each pixel position, instructions to:

retrieve a decorative image pixel color at said pixel position;

retrieve all filter pattern values at said pixel position; and apply all filter pattern values at said pixel position to the decorative image pixel color, thus producing a composite image pixel color;

whereby the composite image visually approximates the decorative image, yet the composite image is machine-readable by a scanner capable of reading the bar code, and the composite image encodes the same data as the bar code.

8. The system of claim 7, wherein the decorative image pixels are defined in a decorative image color space, at least one of the filter patterns is an alternate-color-space filter pattern that operates in a filter pattern color space different from the decorative image color space, and the instructions to apply the alternate-color-space filter pattern values to the decorative image pixel color comprise instructions to:

transform the decorative image pixel color from the decorative image color space into the filter pattern color space, thus producing a transformed pixel color;

apply the alternate-color-space filter pattern values to the transformed pixel color in the filter pattern color space, thus producing an updated transformed pixel color; and transform the updated transformed pixel color from the filter pattern color space back into the decorative image color space.

9. The system of claim 8, wherein:

the decorative image color space comprises a red color component, a green color component, and a blue color component;

the filter pattern color space comprises a brightness color component;

the alternate-color-space filter pattern values define a minimum brightness and a maximum brightness at each said pixel position; and the instructions to apply the alternate-color-space filter pattern values to the transformed pixel color in the filter pattern color space comprise instructions to restrict the brightness color component of the transformed pixel color so that it has a value between the minimum brightness and the maximum brightness.

10. The system of claim 7, at least one of the filter patterns is a varying filter pattern, comprising different filter pattern values at different positions within the varying filter pattern.

11. The system of claim 10, wherein the varying filter pattern comprises at least one position wherein the instructions to apply the varying filter pattern values to the decorative image pixel color, thus producing the composite image pixel color, produce the same composite image pixel color as the decorative image pixel color.

12. The system of claim 7, wherein at least one of the filter patterns is an adorning filter pattern, having values that comprise a means for adorning the composite image with a visual element that was not present in the decorative image.

* * * * *